June 14, 1960
V. FLAX
2,940,230
PROCESS FOR THE PRODUCTION OF PLASTIC
CONTAINERS FILLED WITH FLUID MATERIAL
Filed March 5, 1953
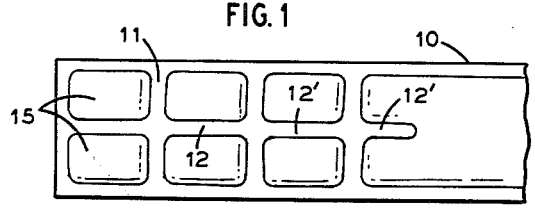
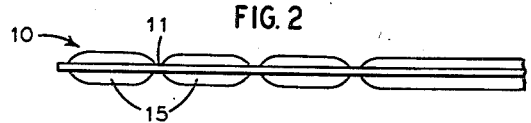
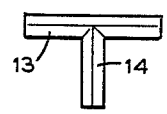
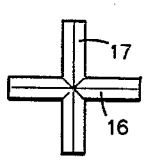
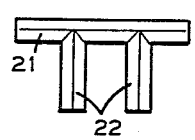
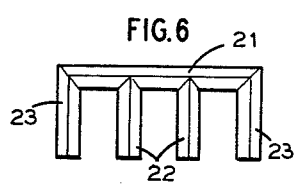
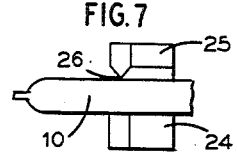
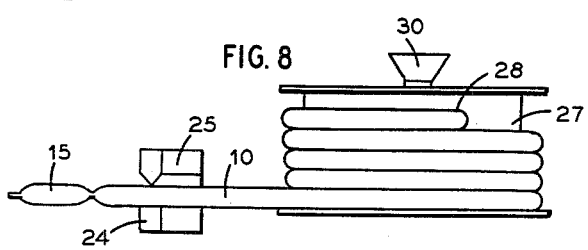
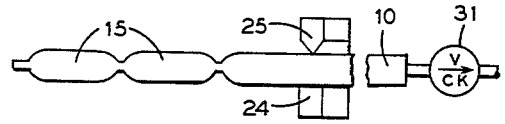
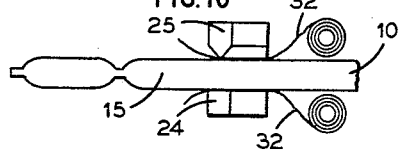
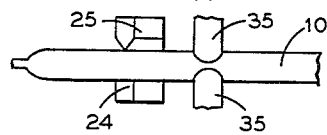
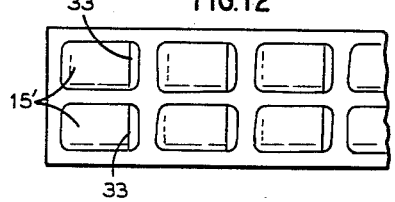
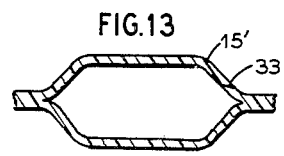
INVENTOR.
Valer Flax
BY
ATTORNEY

United States Patent Office 2,940,230
Patented June 14, 1960

2,940,230
PROCESS FOR THE PRODUCTION OF PLASTIC CONTAINERS FILLED WITH FLUID MATERIAL

Valer Flax, Place Mahomme, Vic-Fezenac, France

Filed Mar. 5, 1953, Ser. No. 340,656

1 Claim. (Cl. 53—39)

This invention relates to the production of containers filled with fluid material by welding together at spaced intervals the walls of a tube of flexible thermoplastic material. The fluid filling material may be a liquid, a paste or other semi-fluid material, or air or other gas. The tube of flexible thermoplastic material from which the individual containers are produced may be formed by extrusion, or by sealing together the longitudinal edges of one or more strips.

In the processes previously employed for the production of such containers, the tube has been divided by transverse weld lines to form a single series of containers joined end to end, the cross section of the initial tube being that required in the finished containers and each successive welding operation producing only a single container.

The process of the present invention is distinguished from such known processes by the fact that the tube is welded both along transverse lines and along one or more longitudinal lines, so as to divide it into sections joined together end to end and each subdivided into two or more containers joined together side by side. By proceeding in this way, tube stock of relatively large cross-section may be used for the production of containers of small cross section; tube stock of the same cross-section may be used for the production of containers of different cross-sectional sizes, by varying the number of containers formed side by side in each section of the tube; and two or more containers may be formed at each welding operation.

The process of the invention may be carried out in many different ways and the examples given below are not to be regarded as limiting the scope of the invention. In particular, the shapes and dispositions of the areas over which the opposite walls of the tube are welded together may be varied as required in order to produce containers of any desired form.

In a preferred method of carrying out the invention the welds effected successively along the length of the tube are each of such form as to divide a still unclosed part of the tube into two or more pockets and to close the open ends of the pockets formed by the previous weld. The pockets formed may have the full length of the required containers. Thus, if two containers are to be formed side by side, the welding tools used may have the general form of the letter T, the stem of the T dividing a short length of the tube along a central longitudinal line into two pockets, while the cross bar divides the tube transversely across its full width at the mouths of the two pockets formed during the previous welding operation. Alternatively, the pockets formed may have only a part of the full length of the required containers, the remaining parts of the longitudinal margins of the containers being formed simultaneously with the transverse weld closing these containers. Thus, when two containers are formed side by side, the welding tools may have the general form of a cross (with either equal or unequal arms) rather than that of a T.

If three or more containers are to be formed side by side, it is only necessary to provide the welding tools with two or more longitudinally extending portions instead of with only one such portion. If desired, the welding tools may include longitudinally extending portions which engage the tube at its edges, so that both side margins of all the containers will be formed by welded areas and all the containers produced will have the same form.

It is to be remarked that the references above and below to the length and sides of the containers are to be understood as referring only to the dimensions of the containers which extend longitudinally of the tube and not as implying that the individual containers necessarily have their greatest dimensions disposed in this direction.

When it is desired to produce cushion shaped containers of more or less rectangular outline, the welding tools may consist simply of a number of straight sections of constant width. However, by appropriately shaping the welding tools, containers of almost any desired form may be produced, including in particular containers provided with a shoulder and neck. Such a neck may be formed as desired at the ends, or at the sides, or at the corners of the containers.

The tube engaging surfaces of the welding tools may both be flat, as has been the case in previously known processes of the general character here in question, the individual continers being separated from one another by cutting through the centre of the welded areas which separate them. However, it is an advantage if the welding together of the walls of the tube is effected while the walls are pressed together between a pair of tools, one at least of which has its tube-engaging surface formed with a projecting rib extending longitudinally of a part or the whole of the weld and of less width than the welded area, so that the weld produced is formed with a groove or line of weakness which facilitates subsequent separation of the containers from one another. Conveniently, the tube-engaging surface of one tool is flat and that of the other is of substantially V-section, the material of the tube which is displaced by the local reduction in thickness of the contacted tube walls bulging into the interior of the containers divided by the weld and thickening their walls adjacent the line of the weld.

Such grooving or thinning of the welded web between two containers is of particular advantage in the case of the longitudinal welds, as the separation by cutting of the containers which are formed side by side in the tube presents practical difficulties, whereas when the longitudinally extending welded areas are weakened in this way, the containers may easily be torn apart. However, the grooving or thinning may be applied alternatively or in addition to the transversely extending welded areas in any case where this offers advantages.

The filling of the tube with the fluid material may be effected in any manner previously known, or in the manner described and claimed in the specification of my co-pending patent application Serial No. 340,657, filed simultaneously herewith. However, in certain cases at least, it is advantageous to fill the tube through its entire length before closing it at either end, the filling fluid being fed into one end of the tube until all the air has been expelled through the other end of the tube. This method may be adopted, for example, where the tube is of opaque material so that the presence of air bubbles cannot be detected visually, or where the tube is to be filled with a liquid, such as a detergent, which has a tendency to froth. In cases such as that last mentioned, the volume of liquid which is pumped or otherwise fed into the tube before closing it at either end may be several times the total capacity of the tube in order to ensure the removal of all air bubbles from the tube.

When this method of filling the tube is adopted the tube is preferably wound up, either before or after filling it with fluid, around a rotatably mounted tank and is progressively unreeled as welding proceeds along the length of the tube, the end of the tube remote from the first weld communicating with the tank, into which excess filling fluid is discharged, as the total volume of the tubing is progressively reduced by the constrictions produced at the welding points.

Various alternative measures may be adopted to maintain a substantially constant pressure inside the tube at the welding point. In one arrangement, the end of the tube remote from the first weld is provided with a valve allowing the escape of fluid from the tube when the pressure inside the tube exceeds a given value. In another arrangement the end of the tube remote from the first weld is in open communication with a reservoir of the filling fluid, whose surface is at such a height above the welding position that the static head of fluid maintains the required pressure within the tube. In a third arrangement the end of the tube remote from the first weld is in open communication with a closed vessel in which there is maintained a gaseous pressure sufficient to produce the required pressure within the tube at the welding position. If the fluid filling material is of an inflammable character, nitrogen or other inert gas is preferably employed to produce the required pressure so as to reduce the risk of fire.

The risk of fire during the production of containers filled with inflammable fluid may also be reduced by interposing between the walls of the tube and the tools by which they are pressed together to effect welding thin, very flexible sheets of a material which is a bad conductor of electricity, does not contain molecules of free carbon and has a melting point above 100 degrees C. The interposed sheets may suitably consist of a fabric formed from glass fibres and impregnated with silicon rubber. Thin flexible sheets of polytetrafluorethylene are also suitable for this purpose. The interposed sheets should be so flexible as not to interfere with the correct shaping of the container by the combined action of the pressure within the tube and the externally applied tools.

The interposed sheets may with advantage have a rough surface texture, which is impressed upon the surface of the welded portions of the tube, when these are softened during the welding operation. The roughened surface thus produced on the welded margin facilitates the eventual tearing open of the container by enabling a better grip to be obtained upon it. When the interposed sheets are of woven construction, the weaving pattern may constitute the desired surface roughness. In other cases the sheets may be provided in any suitable manner with ribs, or other irregularities following any desired pattern.

Even when there is employed one of the above described methods of maintaining substantially constant the pressure existing within the tube at the welding position, difficulty may be experienced in avoiding variations in the volume of fluid enclosed in the individual containers. Such variations are generally undesirable and may be a matter for serious concern in such cases as the packaging of individual doses of liquid medicaments.

Variations in the capacity of the individual containers may be reduced or substantially eliminated if a filled length of the tube, already closed at one end by welding, is temporarily isolated from the remainder of the tube by clamping the opposite walls together, and the walls of the tube are then pressed into engagement and welded together at a point intermediate the first mentioned weld and the clamping point, after which the clamping pressure is released and the length of tube following the newly formed weld is refilled with the fluid material.

When this method is adopted, the fluid in the isolated length of tubing cannot flow back past the clamping point during the welding operation. The pressing together of the walls of the tube at the welding point consequently raises the pressure in the isolated length above that existing in the remainder of the tube and this increased pressure (and consequent increased tension in the walls of the tube) is permanently maintained in the newly formed containers when they are sealed off by welding. The pressure thus produced is, however, completely independent of the length or other characteristics of the tube beyond the clamping point and is determined solely by the characteristics of the relatively short isolated length of tubing, which can far more easily be maintained constant for each successive welding operation. Other things being equal, the pressure produced within the sealed containers will be dependent upon the length of the isolated sector. To avoid excessive pressures this length should be at least 30% greater than the distance between successive welds, but it should not exceed about 20 times that distance.

It will be appreciated that the temporary clamping together of the walls of the tube completely displaces the fluid out of a length of the tube corresponding to the length of the clamping jaws, which may be equal to or greater than the length between successive welds. When the clamping jaws are opened after the formation of the weld, this temporarily emptied section of the tube is automatically refilled by a return flow of fluid from the major portion of the tube.

When the containers are filled with a pasty or semi-liquid material, they may be formed after filling and sealing with delivery apertures by cutting a slit in the wall of the container close and parallel to one of the welds closing the container. The slit may be quite short and will not ordinarily exceed 15 mm. in length.

When such a container is squeezed, the increased pressure of the contents forces apart the lips of the slit so that some of the contents are extruded from the container. When the squeezing pressure is released, the lips of the slit are brought back into engagement to close the aperture by the resiliency of the container walls and more particularly by that of the welded portion which extends close to the slit and has a greater inherent stiffness and restoring power than the remainder of the container. Preferably, the slit is formed immediately adjacent the weld, so that the welded margin of the container itself forms one lip of the slot. This welded margin, which may be either straight or waved, may be used for spreading the material extruded from the container.

For an understanding of the principles of the invention, reference is made to the following description of typical embodiments thereof as illustrated in the accompanying drawings. In the drawings:

Fig. 1 is a plan view illustrating a tube partially divided into filled containers in accordance with the invention;

Fig. 2 is a side elevation view corresponding to Fig. 1;

Figs. 3 through 6 are bottom plan views of dies usable in performing the method of the invention;

Fig. 7 is a partial elevation view illustrating a preferred form of dies;

Fig. 8 is an elevation view illustrating a preferred method of filling the tube with material;

Fig. 9 is an elevation view illustrating a preferred arrangement for maintaining a predetermined pressure within the tube as it is filled;

Fig. 10 is an elevation view illustrating the use of interposed di-electric strips during the heat sealing;

Fig. 11 is a partial elevation view illustrating the sealing off of part of the tube during the heat sealing operation;

Fig. 12 is a partial plan view of a plurality of filled containers provided with discharge slits; and Fig. 13 is a sectional view through one of the containers of Fig. 12.

Referring to Figs. 1 and 2 of the drawings, in subdividing the tube into individual containers, the tube 10 is heat sealed along transverse welds 11 and longitudinal welds 12 to subdivide the tube both laterally and longitudinally into containers 15 arranged in side-by-side and end-to-end relation. In accordance with an alternative form of the invention, each heat seal comprises a transverse weld 11 extending the full width of the tube and longitudinal welds 12' each extending about ½ the length of a container.

This particular manner of subdividing the tube may be effected by the T-shaped die shown in Fig. 3 including a head 13 having a length equal to the width of tube 10 and a stem 14 equal to substantially the length of each seal weld 12 separating laterally spaced containers 15.

Fig. 4 shows an alternative die arrangement in which one cross arm 16 has a length equal to the width of tube 10 and the other cross arm 17 has a length equal to two of the longitudinal welds 12'.

The tube may also be subdivided into three containers arranged in side-by-side relation by means of the die shown in Fig. 5 including a cross bar 21 for forming the transverse weld across the full width of tube 10 and stems 22 each having a length equal to substantially the length of a longitudinal weld 12. In further accordance with the invention, the edges of the tube made be sealed by the die shown in Fig. 6 which, in addition to including parts 21 and 22, has side sealing surfaces 23.

Fig. 7 illustrates the aforementioned preferred die shape in which the lower die 24 has a flat upper face and the upper die 25 has a V-shaped die engaging surface 26.

Referring to Fig. 8, the pressure may be maintained in tube 10 by winding the tube around a drum reservoir 27 with the end 28 of tube 10 connected to the reservoir and suitable means 30 being provided to maintain a pressure head on the contents in the reservoir and in tube 10.

As best seen in Fig. 9, the pressure within tube 10 may be maintained at a preset value, with relief of excess pressure, by providing a relief check valve 31 at the filling end of tube 10.

The use of the di-electric sheets interposed between the dies and the tubes is illustrated in Fig. 10, wherein strips of di-electric material 32 are unwound from reels and interposed between the dies and the tubes.

Fig. 11 illustrates non-sealing dies 35 which may be used to seal off a preset length of the tube during heat sealing of dies 24, 25.

As previously stated, if the material is a pasty one, the containers 15' may have slits 33 formed therein as shown in Figs. 12 and 13, these slits being normally closed by opening when pressure is applied to the containers 15 to allow discharge of the contents.

While specific embodiments of the invention have been shown and described in detail to illustrate the application of the principles of the invention, the invention may be embodied otherwise without departing from such principles.

What I claim is:

In a process for the production of containers filled with fluid material by welding together at spaced intervals the walls of a periodically movable tube of flexible thermoplastic material, wherein the tube is welded both along transverse lines and along one or more longitudinal lines, so as to divide it into sections joined together end to end and each subdivided into two or more containers joined together side by side; the novel step comprising forming sets of simultaneously formed welds sequentially along the length of the tube, each simultaneously formed set comprising a transverse weld, closing the open ends of pockets formed by the previous set of simultaneously formed welds, and at least one longitudinal weld extending from the transverse weld and dividing the unclosed part of the tube laterally into at least two side by side pockets, said thus formed pockets being only a part of the full length of the containers being formed, the remaining at least one longitudinal weld for the pockets of the containers being formed simultaneously with the transverse weld closing said containers.

References Cited in the file of this patent

UNITED STATES PATENTS

| | | |
|---|---|---|
| 636,317 | Von Buhler | Nov. 7, 1899 |
| 1,927,404 | Jensen | Sept. 19, 1933 |
| 2,156,466 | Vogt | May 2, 1939 |
| 2,185,647 | Penn | Jan. 2, 1940 |
| 2,272,530 | Patterson | Feb. 10, 1942 |
| 2,430,995 | Roos | Nov. 18, 1947 |
| 2,469,975 | McClay | May 10, 1949 |
| 2,508,197 | Singer | May 16, 1950 |
| 2,525,651 | Clunan | Oct. 10, 1950 |
| 2,530,400 | Rado | Nov. 21, 1950 |
| 2,566,533 | Poux | Sept. 4, 1951 |
| 2,616,232 | Meyer | Nov. 4, 1952 |
| 2,793,481 | Rado | May 28, 1957 |

FOREIGN PATENTS

| | | |
|---|---|---|
| 504,376 | Belgium | July 14, 1951 |